(12) United States Patent
Brown

(10) Patent No.: US 9,454,345 B1
(45) Date of Patent: Sep. 27, 2016

(54) APPARATUS FOR FASTER DIVISION

(71) Applicant: GOOGLE INC., Mountain View, CA (US)

(72) Inventor: Jorg Anthony Brown, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 368 days.

(21) Appl. No.: 14/094,403

(22) Filed: Dec. 2, 2013

(51) Int. Cl.
*G06F 7/487* (2006.01)

(52) U.S. Cl.
CPC .................................. *G06F 7/4873* (2013.01)

(58) Field of Classification Search
None
See application file for complete search history.

(56) References Cited

U.S. PATENT DOCUMENTS

| | | | | |
|---|---|---|---|---|
| 5,442,581 A * | 8/1995 | Poland | .................... | G06F 7/535 708/650 |
| 5,596,763 A * | 1/1997 | Guttag | .................... | G06F 7/575 708/236 |
| 5,606,677 A * | 2/1997 | Balmer | ................. | G06F 7/5324 708/625 |
| 5,825,681 A * | 10/1998 | Daniel | .................... | G06F 7/535 708/654 |
| 6,351,760 B1 * | 2/2002 | Shankar | .............. | G06F 7/49947 708/504 |

* cited by examiner

*Primary Examiner* — Michael D Yaary
(74) *Attorney, Agent, or Firm* — Birch, Stewart, Kolasch & Birch, LLP

(57) ABSTRACT

A system and method for reducing central processing unit transistor count when dividing multiple floating point numbers is disclosed. An example system may receive a plurality of floating point numbers to be inverted as denominator values. The denominator values may be grouped into pairs and multiplied. Products of pairs may be multiplied to produce combinations of products of denominator values until all denominator values have been multiplied together. The product of all denominator values may be inverted using a single division. The combinations of products of denominator values from the multiplications achieved before the division may be multiplied with the inverted product from the division to compute inversions of all denominator values. In some embodiments, an example system may receive a plurality of floating point numbers as numerator values that each correspond to a denominator value. Numerator values may be multiplied with corresponding inversion denominator values to produce division results.

6 Claims, 7 Drawing Sheets

APPARATUS FOR FASTER DIVISION

BACKGROUND

Division is often slow on modern central processing units (CPUs). Sometimes, division can take more than fifty (50) cycles on a CPU, even when the CPU can perform multiple functions in one (1) or two (2) cycles. In a conventional system, a complicated equation with ten (10) multiplication steps, twenty (20) addition steps, and two (2) division steps will spend the majority of the CPU time performing the division steps. As recognized by the inventor, there should be a system and method that allow for a way to do division that speeds up processing on CPUs by minimizing the number of transistors required for the division.

SUMMARY

This specification describes technologies relating to central processing unit usage in general, and specifically to methods and systems for reducing central processing unit transistor count when dividing multiple floating point values simultaneously.

In general, one aspect of the subject matter described in this specification can be embodied in a method and an apparatus for reducing central processing unit transistor count when inverting multiple numbers. An example method includes: receiving a plurality of numbers to be inverted as denominator values; grouping the denominator values into pairs; multiplying the pairs; multiplying the products of pairs to produce combinations of products of the denominator values until all denominator values have been multiplied together; inverting the product of all denominator values multiplied together using a single division; and multiplying combinations of products of the denominator values from the multiplications achieved before the division to compute inversions of all the denominator values. An example apparatus includes: a first set of denominator registers that store numbers representing denominator values; a first set of multiplication units that multiply pairs of register values and products of pairs of register values to produce combinations of products of the denominator values until all denominator values have been multiplied together; a single division unit that performs one division to invert the product resulting from multiplying all denominator values together; a second set of multiplication units that multiple combinations of products of the denominator values from the first multiplication units with the inverted product from the division unit; and a second set of denominator registers that store the results of the second multiplications resulting in inversions of all the numbers representing the denominators.

These and other embodiments can optionally include one or more of the following features: an example method may include: receiving a plurality of numbers as numerator values that each correspond to one of the denominator values and multiplying each numerator with the corresponding inversion of the denominator value to produce division results; an example method may include: removing exponents from the denominator values and restoring the exponents after the inversions of all denominator values have been computed; an example apparatus may include one or more numerator registers that store numbers representing numerator values for at least two divisions that should be performed and one or more third set of multiplication units that multiply the inverted denominators with the corresponding numerator values to produce division results; an example apparatus may include a storage unit for storing exponents that are removed from the denominator numbers for later use; and a third set of denominator registers that store the inversions of all the numbers representing the denominators with the exponents added back in;

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

According to aspects of the inventive concepts, central processing unit usage may be reduced by minimizing the number of divisions required when dividing floating point numbers. An example method may allow for several multiplication steps and a single division step, regardless of how many numbers are to be divided.

Figure 1:
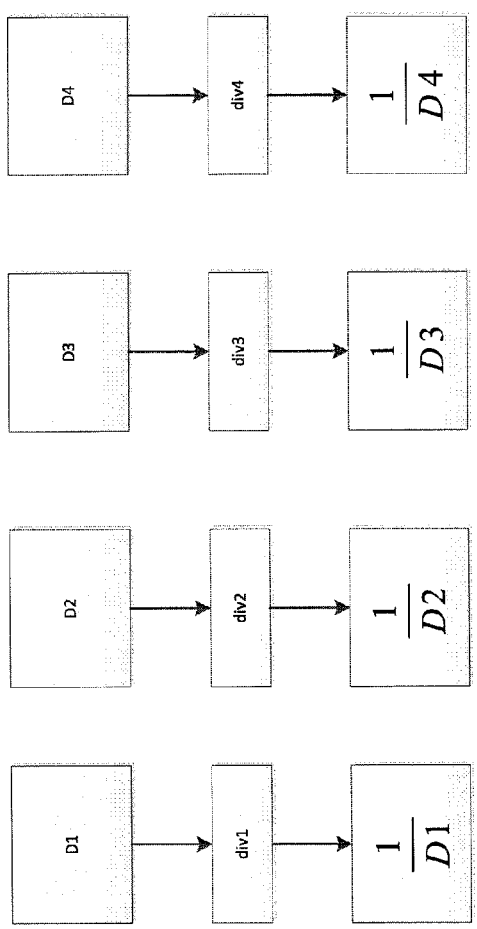
FIG. 1 is a block diagram illustrating conventional parallel division.

In standard division, to perform one divide operation, two numbers are provided, a numerator and a denominator. Then, the numerator is divided by the denominator. FIG. 1 shows standard division operations for dividing the number 1 by four different numbers, D1, D2, D3, and D4. As illustrated in FIG. 1, the number 1 is divided by each number separately, resulting in four division operations.

An example method according to the invention may perform several divisions together as one step in order to minimize the number of division steps. An example method may begin a division operation by inverting all floating point numbers that are denominator numbers. The results from inversion may then be multiplied by the appropriate numerators to complete the divisions.

For example, an example method may receive a request to perform two divisions, 1 divided by a and b divided by c which should result in $$\frac{1}{a}$$

and $$\frac{b}{c}.$$

An example method may invert the denominator numbers by first computing the product of the denominators, a*c=ac. Then, the product may be inverted, $$\frac{1}{ac}.$$

The inverse product may then be multiplied by the original floating point denominator numbers to get the denominator inverses, $$\frac{1}{ac}*c=\frac{1}{a},\frac{1}{ac}*a=\frac{1}{c}.$$

The inverse numbers may then be multiplied by their respective numerator values to finish the division. In the division, 1 divided by a, the numerator is 1 so $$\frac{1}{a}$$

does not need to be multiplied by any number. In the division, b divided by c, the numerator is b, so the inverse of c, $$\frac{1}{c},$$

resulting from the inversion step should be multiplied by b to complete the division. Multiplying $$\frac{1}{c}$$

by b results in $$\frac{b}{c}.$$

Figure 2:
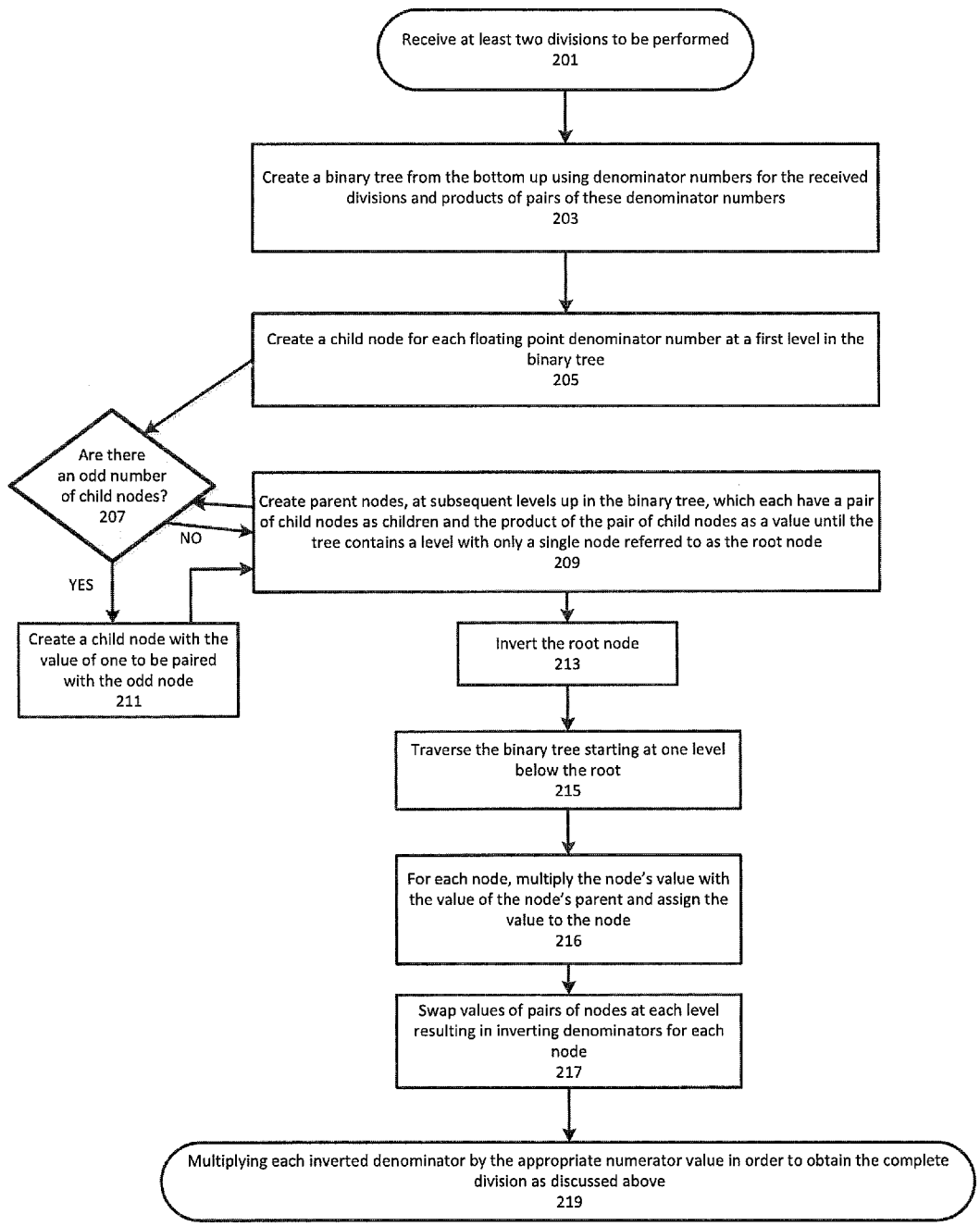
FIG. 2 is a flow diagram of an example method for reducing central processing unit transistor count when dividing multiple floating point numbers.
Figure 3:
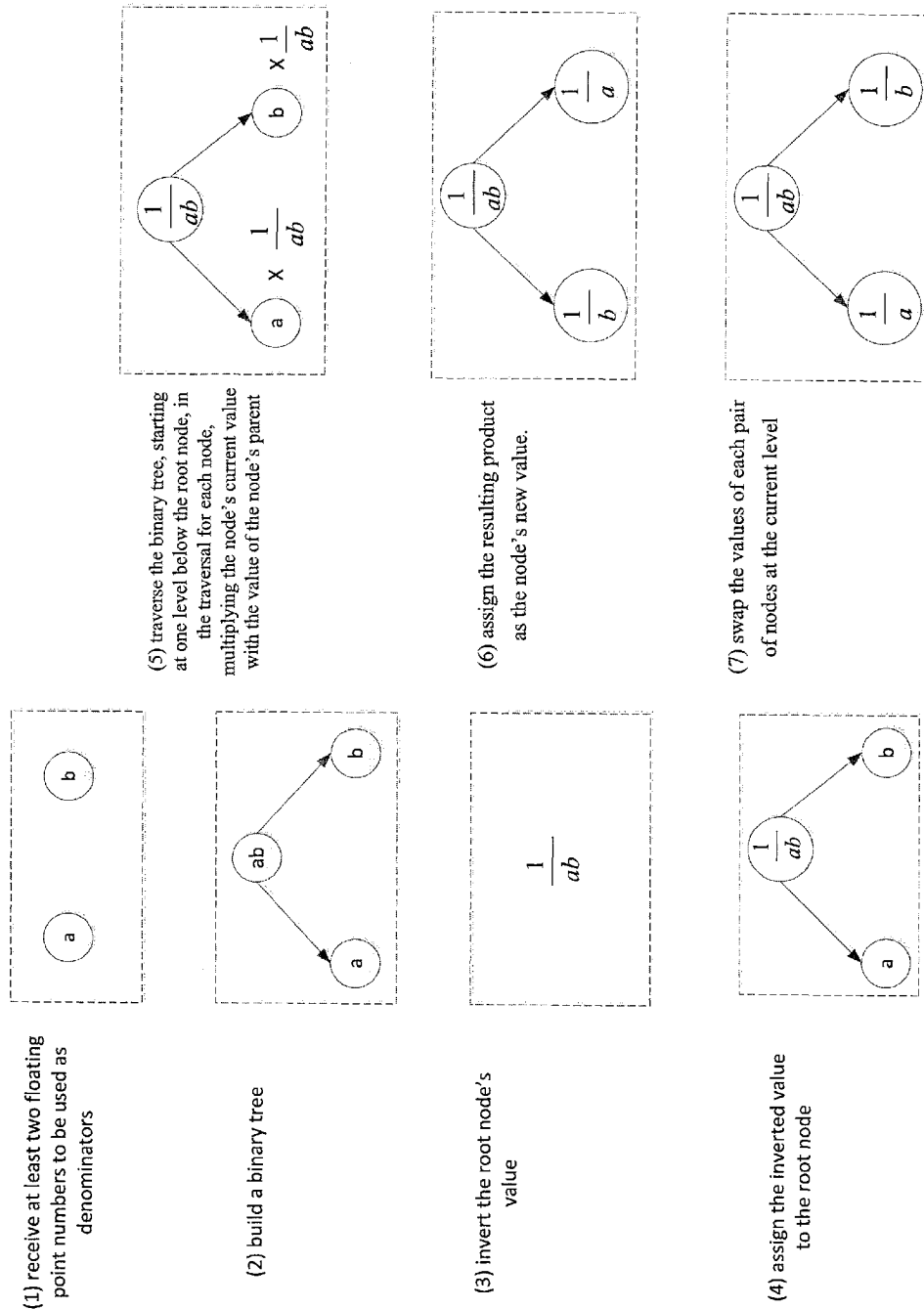
FIG. 3 is a flow diagram illustrating an example process for using a binary tree to reduce central processing unit usage.

Computationally faster division may be performed using data structures in software or hardware in order to reduce CPU usage. In one embodiment, a binary tree data structure may be created as shown in FIGS. 2 and 3. An example method may receive at least two division operations to perform (201). A binary tree may be created from the bottom up using denominator numbers from the divisions and products of pairs of these denominator numbers (203). A binary tree is a tree data structure in which each node has at most two child nodes.

A child node of the binary tree data structure may be created for each floating point denominator number and the value of the floating point number may be assigned to the node at a first level (205). Then parent nodes may be created, at a second level up, which each have a pair of child nodes as children and the product of the pair of child nodes as a value (209).

If there are an odd number of child nodes, a child node is created with the value of one in order to be paired with the odd node (207, 211). Parent nodes are created for subsequent levels up the binary tree until the tree contains a level with only a single node referred to as the root node (209). The root node should be the product of all values of the received floating point denominator numbers. The root node value may then be inverted and the inverted value may be assigned to the root node (213).

Then, the binary tree may be traversed starting at one level below the root node (215). For each node, the node's value is multiplied with the node's parent's value (216). The node is then assigned the resulting value. The values of pairs of nodes at each level are then swapped (217). This traversal, value assignment, and swapping results in inversions of each of the floating point denominator values being assigned to each node at the bottom level. Each inverted denominator may then be multiplied by the appropriate numerator value in order to obtain the complete division as discussed above (219).

A visual representation of this process is shown in FIG. 3 for two divisions. Binary tree nodes are created for two numbers that should be used as denominators as shown in step 1. A parent, and in this case the root node, is created for these two nodes by multiplying the values of the numbers together as shown in step 2. The root node's value is then inverted and the inverted value may be assigned to the root node.

Figure 4:
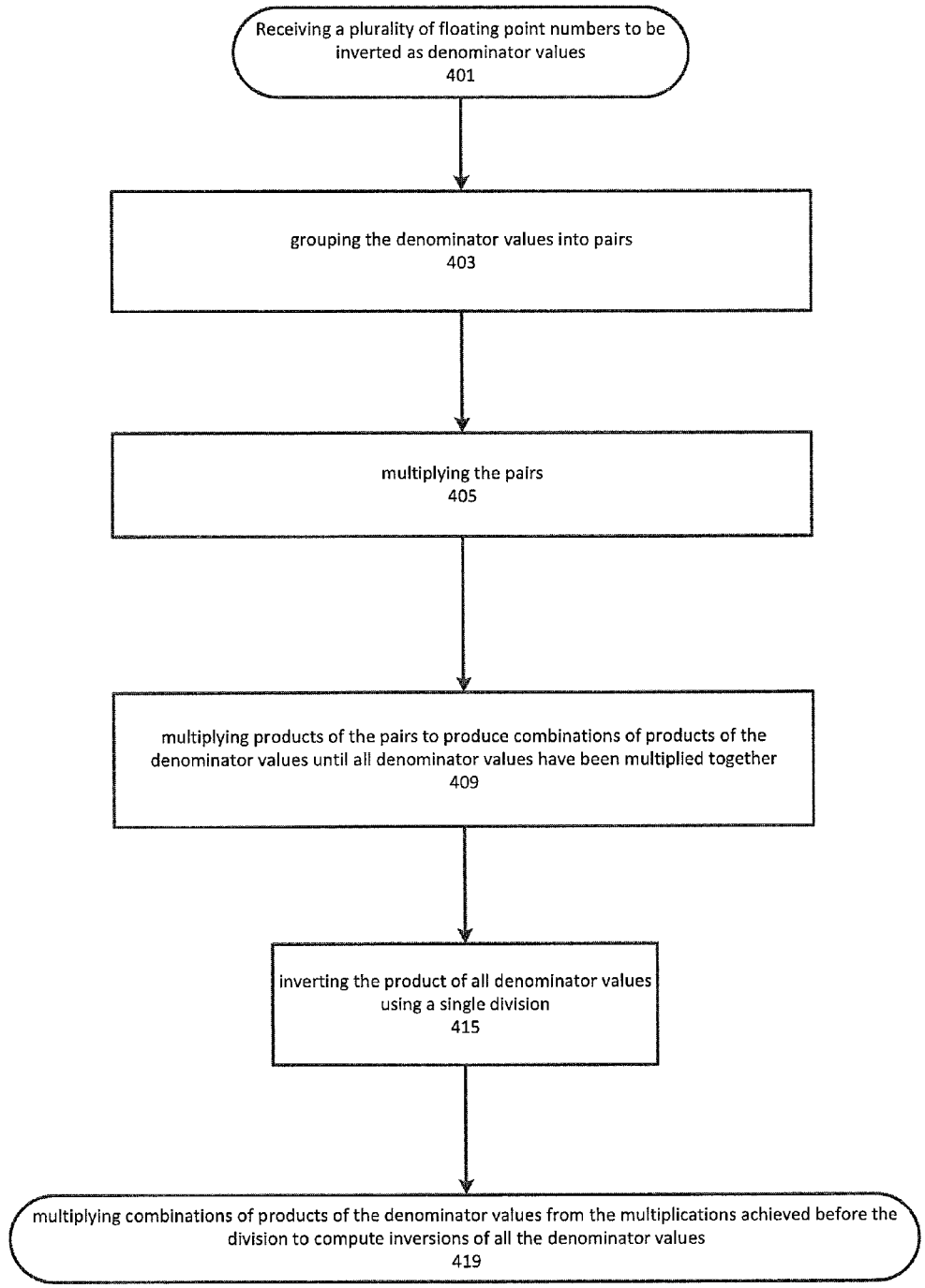
FIG. 4 is a block diagram illustrating an example hardware system for reducing central processing unit transistor count when dividing multiple floating point numbers.

Inversions or reciprocals of numbers may be found using an example method for inversion that requires only one division process regardless of how many numbers that should be inverted. An example method, shown in FIG. 4, begins with receiving a plurality of floating point numbers to be inverted as denominator values (401). The denominator values may be grouped into pairs (403) and the pairs may be multiplied together (405). The example method may then multiply products of pairs to produce combinations of products of denominator values until all denominator values have been multiplied together (409). The product of all denominator values may be inverted using a single division (415). This inverted product may be multiplied with combinations of products of the denominator values from the multiplications achieved before the division to compute inversions of all the denominator values (419).

Figure 5:
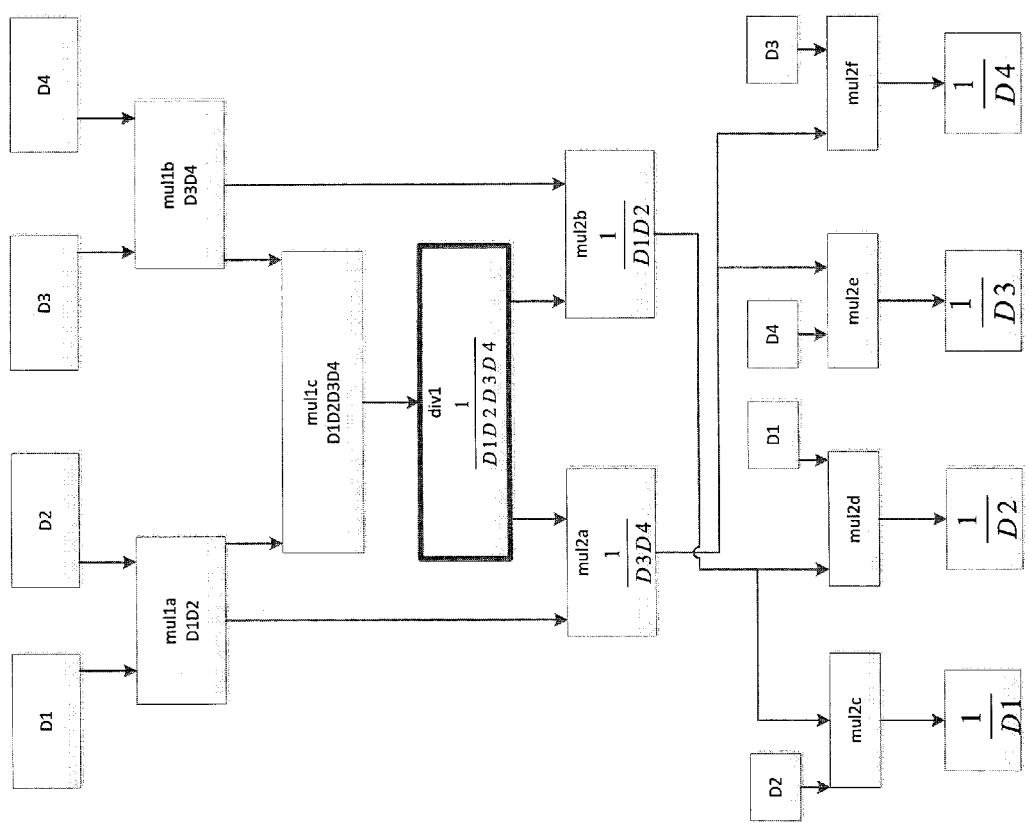
FIG. 5 is a block diagram illustrating an example hardware system for reducing central processing unit transistor count when dividing multiple floating point numbers.
Figure 6:
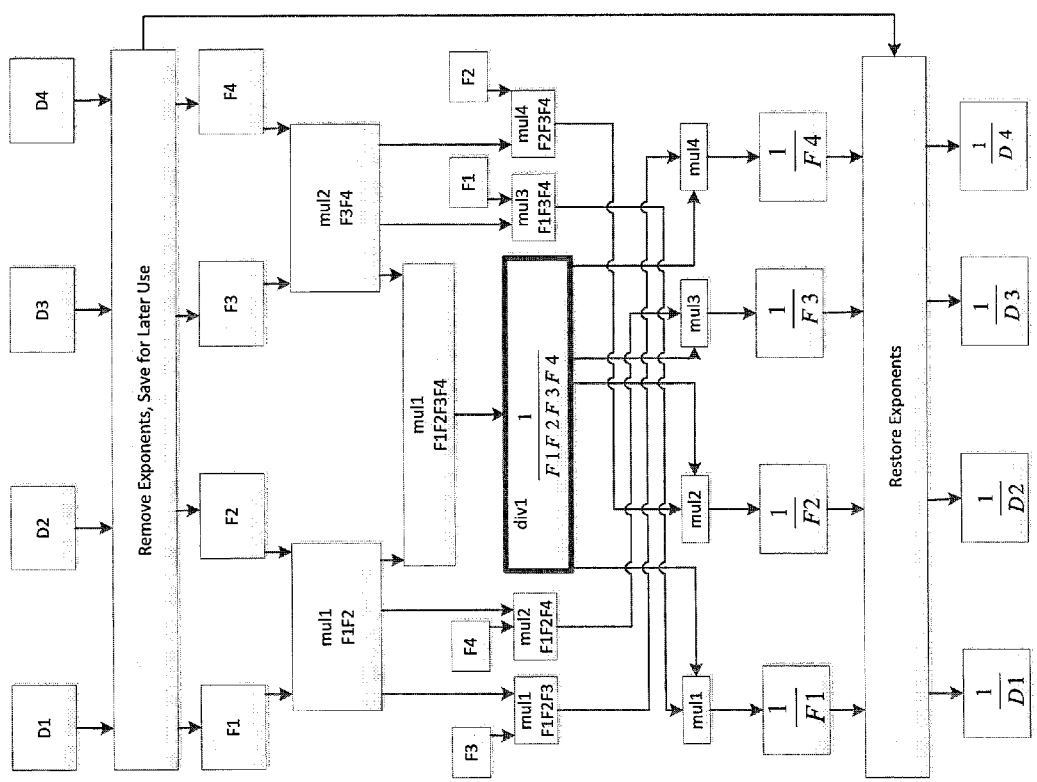
FIG. 6 is a flow diagram of an example method for reducing central processing unit transistor count when inverting multiple floating point numbers.

In some embodiments, an integrated circuit may be used to perform the inversions and divisions as shown in FIGS. 5 and 6. A hardware system for reducing central processing unit transistor count when inverting multiple floating point numbers may include a first set of denominator registers (D1 . . . D4) that store floating point numbers representing denominator values as shown in FIG. 5. A first set of multiplication units (or multipliers, mul1a . . . mul1c) may multiply pairs of register values and products of pairs of register values to produce combinations of products of the denominator values until all denominator values have been multiplied together. A single division unit (div1) may perform one division to invert the product resulting from multiplying all denominator values together. A second set of multiplication units (mul2a . . . mul2f) may multiply combinations of products of the denominator values from the first multiplication units with the inverted product from the division unit. A second set of denominator registers $$\left(\frac{1}{D1} \cdots \frac{1}{D4}\right)$$

may store the results of the second multiplications resulting in inversions of all of the floating point numbers representing the denominators. Although FIG. 5 illustrates finding inversions for four floating point numbers, aspects of the inventive concepts are not limited to four floating point numbers, but can be used for any combination of numbers greater than two.

After finding the inverse of denominator numbers, these numbers may be multiplied with corresponding numerator values to compute a division of two floating point numbers with a numerator that is a number other than 1. A hardware system may require a set of numerator registers to store the numerator values and a third set of multiplication units that multiply inverted denominators with the corresponding numerator values to produce division results.

In some embodiments, products of the denominator values may be too large or too small to represent the numbers within the range of values supported by the floating point format. Therefore, exponents may be stripped off as shown in FIG. 6 and added back in at the end of the process in order to prevent over/underflow.

For example, there may be four numbers, a, b, c, and d. Each number may be $3*2^{32}$, or approximately 12 billion. These numbers may be represented by the bit pattern, "1.100000000" and an exponent of 33. If a is multiplied by b and c is multiplied by d, the products may be calculated in 32-bit floating-point precision resulting in a bit pattern of "1.001000000" with an exponent of 67. However, if all of the numbers are multiplied together, the resulting product is 1.010001000 with an exponent of 134. Standard 32-bit floating-point number representation has a limit of 128 on the exponent. Therefore, the floating-point hardware may generate a result of "infinity" and the rest of the calculation may be lost. An example embodiment may calculate the product of a*b*c*d without losing any of the calculation. First, the exponent, 33 in this example, may be saved away. The four binary values, each "1.1" representing 1.5 decimal, may be provided to an example division process. The binary inversion of "1.1" may be calculated. The binary inversion of "1.1" with no exponent is "1.0101010101" with a −1 exponent which is equivalent to $$\frac{2}{3}.$$

To complete the division, the saved exponent, 33, is subtracted from the −1 exponent that resulted from the inversion. Therefore, the exponent value is −34, resulting in no overflow or underflow.

Figure 7:
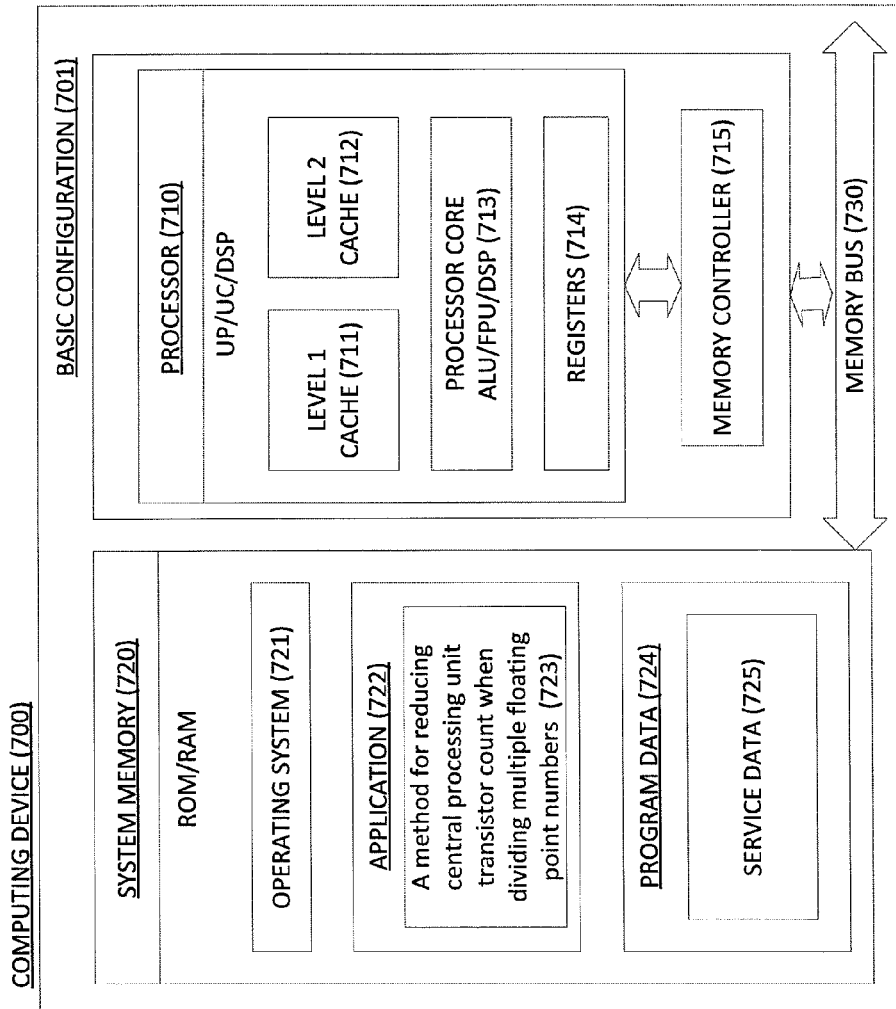
FIG. 7 is a block diagram illustrating an example computing device.

FIG. 7 is a high-level block diagram of an example computer (700) that is arranged for reducing central processing unit transistor count when inverting or dividing multiple floating point numbers. In a very basic configuration (701), the computing device (700) typically includes one or more processors (710) and system memory (720). A memory bus (730) can be used for communicating between the processor (710) and the system memory (320).

Depending on the desired configuration, the processor (710) can be of any type including but not limited to a microprocessor (μP), a microcontroller (μC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a binary tree or a hardware system that reduces central processing unit usage when dividing floating point numbers by using a single division regardless of the amount of numbers that should be divided. Program Data (724) includes storing instructions that, when executed by the one or more processing devices, implement a system and method for reducing central processing unit transistor count when dividing multiple floating point numbers. (723). In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for reducing central processing unit usage when inverting numbers, the apparatus comprising:
   a first set of denominator registers that store numbers representing denominator values;
   a first set of multiplication circuitry that multiply pairs of register values and products of pairs of register values to produce combinations of products of the denominator values until all denominator values have been multiplied together;
   a single division circuit that performs one division to invert the product resulting from multiplying all denominator values together;
   a second set of multiplication circuitry that multiply combinations of products of the denominator values from the first multiplication circuitry with the inverted product from the division circuit; and
   a second set of denominator registers that store the results of the second multiplications resulting in inversions of all of the numbers representing the denominators.

2. The apparatus of claim 1, further comprising:
   one or more numerator registers that store numbers representing numerator values for at least two divisions that should be performed and
   one or more third set of multiplication circuitry that multiply the inverted denominators with the corresponding numerator values to produce division results.

3. The apparatus of claim 1, further comprising:
   a storage unit for storing exponents that are removed from the denominator numbers for later use; and
   a third set of denominator registers that store the inversions of all the numbers representing the denominators with the exponents added back in.

4. A method for reducing central processing unit usage when inverting numbers, the method comprising:
   receiving, via a set of denominator registers, a plurality of numbers to be inverted as denominator values;
   grouping the denominator values into pairs;
   multiplying, using multiplication circuitry, the pairs;
   multiplying, using multiplication circuitry products of the pairs to produce combinations of products of the denominator values until all denominator values have been multiplied together;
   inverting, using single division circuit, the product of all denominator values multiplied together using a single division; and
   multiplying, using multiplication circuitry, combinations of products of the denominator values from the multiplications achieved before the division with the inverted product from the division to compute inversions of all the denominator values.

5. The method of claim 4, further comprising:
   receiving, via a numerator register, a plurality of numbers as numerator values that each correspond to one of the denominator values and
   multiplying, using multiplication circuitry, each numerator with the corresponding inversion of the denominator value to produce division results.

6. The method of claim 4, further comprising:
   removing exponents from the denominator values and
   restoring the exponents after the inversions of all the denominator values have been computed.

* * * * *